United States Patent [19]

Comminge et al.

[11] Patent Number: 4,565,412
[45] Date of Patent: Jan. 21, 1986

[54] TRACK AND ROAD WHEEL ASSEMBLIES FOR TRACKED VEHICLES

[75] Inventors: Hubert Comminge, Springfield, Va.; John E. Cunningham, Orlando, Fla.; Howard R. White, Jr., Littleton, Colo.

[73] Assignee: The United States of America as represented by the Secretary of the Army, Washington, D.C.

[21] Appl. No.: 519,959

[22] Filed: Aug. 3, 1983

[51] Int. Cl.$^4$ .................... B62D 55/12; B62D 55/20
[52] U.S. Cl. ........................................ 305/53; 305/56; 305/39
[58] Field of Search .................... 305/56, 57, 39, 53, 305/54, 55

[56] References Cited

U.S. PATENT DOCUMENTS

| | | | |
|---|---|---|---|
| 384,797 | 6/1888 | Tipping | 305/56 |
| 3,738,715 | 6/1973 | Carlsson | 305/56 |

*Primary Examiner*—David A. Scherbel
*Attorney, Agent, or Firm*—John E. Becker; Anthony T. Lane; Robert P. Gibson

[57] ABSTRACT

A land mine resistant road wheel and track assembly for tracked vehicles for which each road wheel includes a center hub surrounded by a plurality of fiberglass support rings whch are, in turn, surrounded by a fiberglass rim member. The entire road wheel is encapsulated in polyurethane which fills the spaces within and between the support rings, but which does not extend into the center hub or into bores aligned with the openings of the support rings, which bores receive mounting bolts for the road wheel. The road wheels are utilized singly and are received in circular grooves formed in the shoes which form the track. The shoes which form the track are made of fiberglass which is molded around a steel yoke. Each steel yoke is provided with a pair of key slots therethrough, each slot of which receives a link that rotates ninety degrees in order to lock in the key slot. Steel pins are utilized to join the links together and, thus, assemble the flexible endless track for use with a plurality of the aforedescribed road wheels.

17 Claims, 15 Drawing Figures

TRACK AND ROAD WHEEL ASSEMBLIES FOR TRACKED VEHICLES

STATEMENT OF GOVERNMENT INTEREST

The invention described herein may be manufactured and used by or for the United States Government for governmental purposes without the payment of any royalties therefor or thereon. This patent is expected to be assigned to the United States Government.

BACKGROUND OF THE INVENTION

1. Field of the Invention

The instant invention relates to track and road wheel assemblies for tracked vehicles, and more particularly, the instant invention relates to track and road wheel assemblies for tracked military vehicles, such as tanks, armored personnel carriers and the like.

2. Technical Considerations and Prior Art

Introduction of mechanically emplaced and air-delivered mines on the modern battlefield has compounded the problem of maintaining the mobility of armored vehicles. Historically, warfare senarios and deployment techniques have limited the use of land mines to certain well defined situations to impede or channel opposing forces. Advance knowledge of mine field locations could permit effective countermeasures using mine-clearing equipment, such as mine-clearing rollers mounted on lead vehicles, projected explosive line charges or, depending on mine density, sacrificing vehicles and uniformed personnel by simply charging over the mine field. Air and artillery delivery capabilities have introduced offensive mining techniques wherein mines are laid at random along approach routes.

Tracked vehicles, such as tanks, can be stopped with relatively small three-pound explosive charges which are easily delivered by airplanes and artillery. Charges of this type cause a mobility failure by knocking out track sections and temporarily stalling armored vehicles, such as tanks, which can then be destroyed by artillery and anti-tank weapons which generally cover a mined area. Vulnerability studies have predicted severe losses of armored combat units due to these new offensive mining techniques.

In view of the aforementioned change in expected battlefield conditions, there is a need for new and improved track configurations for tracked vehicles.

SUMMARY OF THE INVENTION

In view of the aforementioned considerations, it is a feature of the instant invention to provide new and improved road wheel assemblies and track assemblies which will withstand explosive charges which are sufficient to totally disable the tracks of current tracked vehicles by destroying one tread and an adjacent road wheel.

In view of this feature, the instant invention contemplates a road wheel which includes a hub that is surrounded by a plurality of support rings which engage the hub and are held in contact therewith by generally a wheel rim and the encapsulating plastic filler body material. The wheel rim is designed to support the vehicle in a groove formed in the shoes of the track as the track is advanced by drive sprockets.

The instant invention further includes the concept of a shoe assembly which, when combined with other shoe assemblies, provides the vehicle with a track. Each shoe assembly includes a fiberglass shoe which retains a yoke that, in turn, receives pairs of links through key slots. The links are joined together by pins to assemble the shoes into a track.

In addition, the instant invention contemplates a wheel and track assembly employing the afore-described road wheel assembly and track assembly in combination.

DESCRIPTION OF THE PREFERRED EMBODIMENT

Figure 1:
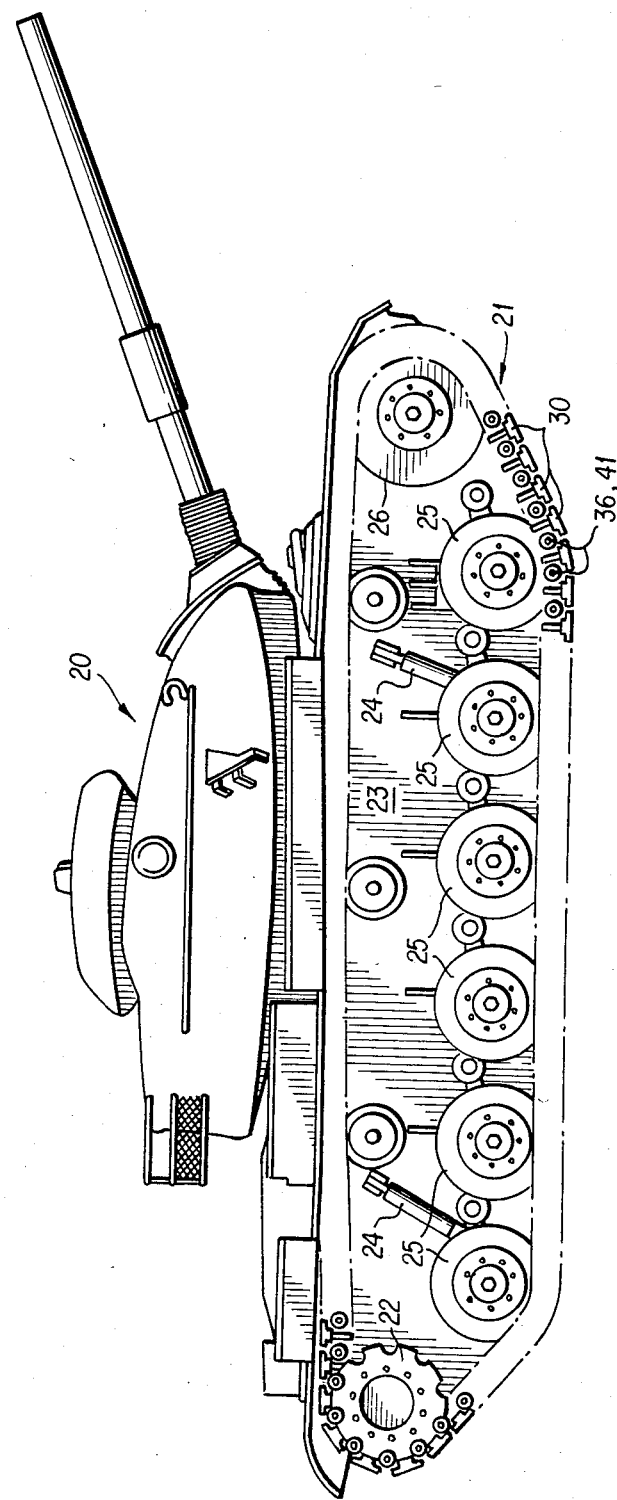
FIG. 1 is a side view of an armored vehicle, in this case a tank, employing the road wheel assembly, track assembly and combination of assemblies in accordance with the features of the instant invention.

Referring now to FIG. 1, there is shown a tracked, armored vehicle, such as a tank, designated generally by the numeral 20, which utilizes a tread assembly and road wheel assembly configured in accordance with the principles of the instant invention. The tank 20 rides on a track, designated generally by the numeral 21, which is driven by a drive wheel 22. The hull 23 of the tank is supported on a plurality of single road wheels 25 via a conventional suspension system 24. The track 21 is also trained around a front road wheel 26 which normally serves as an idler, except when the front of the tank dips or when the tank encounters an obstruction.

It is a feature of the instant invention to utilize single road wheels 25 in lieu of the dualroad wheel configuration of the prior art. By utilizing single road wheels 25, a large portion of the explosive blast flows by the individual road wheel and is quickly dissipated which minimizes damage to the road wheels and other suspension parts, such as road arms, shock absorbers, and torsion bars (none of which are shown in detail). Since single road wheels 25 are utilized instead of pairs of road wheels, the design of the track 21 has been altered so that instead of a series of projections which are received between road wheel pairs, the track 21 has a single groove 31 (FIGS. 2, 4, 5, 6) which receives the road wheels 25.

Figure 2:
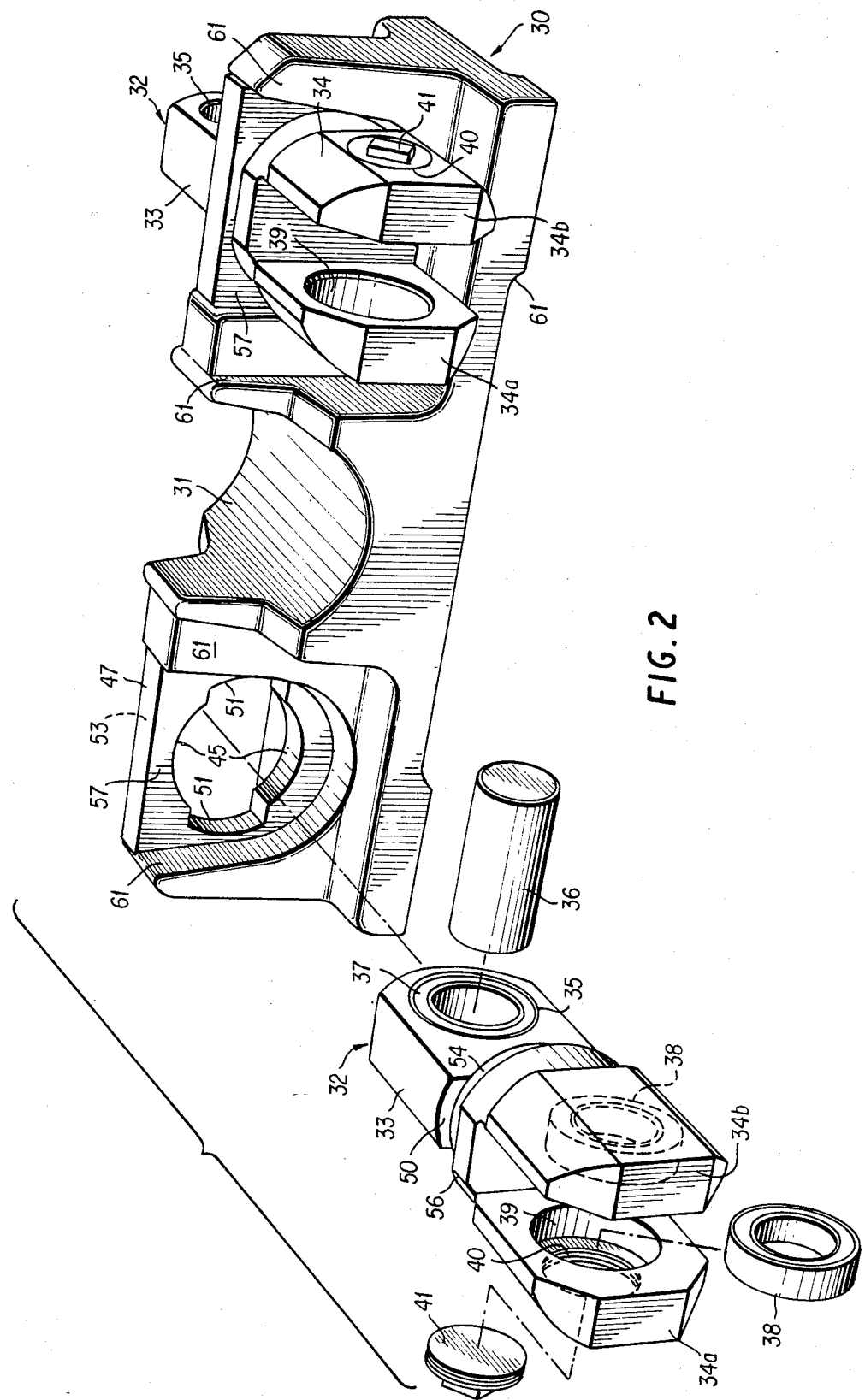
FIG. 2 is an exploded perspective view showing a single shoe, and the links and pins employed to assemble the single shoe with other shoes in order to form the track shown in FIG. 1.

Referring now to FIG. 2, where one shoe, designated generally by the numeral 30, of the track 21 is shown, the laterally extended shoe includes a medial body portion shaped to provide a transverse groove 31 which is the groove in which the road wheels 25 are received to support the tank 20. Each shoe 30 is connected between a pair of similar adjacent shoes by two identical links, designated generally by the numeral 32. Each link 32 has a single leg portion 33 and a bifurcated leg or U-shaped portion 34. The single leg portions 33 of each link 32 have a bearing and pin-receiving hole 35 and is adapted to fit between the legs of the U-shaped portion 34 of an adjacent link and are held rotatably in place by steel pins 36. In order to facilitate rotation between the links, the single legs 33 have bearings 37 seated therein and the bifurcated legs 34a and 34b likewise have corresponding oppositely spaced and aligned bearings 38 into which the connecting pins 36 are received. The spaced bearings 38 are bottomed in a recess 39 in each of legs 34a and 34b of the U-shaped portion 34. The leg 34b has a threaded hole 40 which receives a threaded cap 41 after assembly of the adjacent track link with steel pin 36. Bearings 37 and 38, as shown by the concentric rings representing inner and outer portions, are preferably filled therebetween with an elastomeric material in lieu of rollers or balls which have not been illustrated.

The links 32 are received through key slots 45 in a steel yoke 47. The yoke 47 is in combination with the encapsulating fiberglass material to provide a pair of upwardly extending shoe support means. Assembly of the shoes is is accomplished by simply rotating the links 32 until they will slide through the key holes 45 and thereafter rotating the links ninety degrees to lock the links in place.

Considering the locking arrangement in more detail, each of the single leg portions 33 includes an opposed pair of shoulders 50, only one of which is shown in FIG. 2, which pass through slot portions 51, 51 in key holes 45 in the yoke 47 when the link 32 is rotated ninety degrees from the position shown in FIG. 2. After inserting the links 32 through the key holes 45 so that the leg portions 33 clear the key holes, the links are rotated ninety degrees to abut the shoulders 50 with the wall 53 of the yoke. The link 32 each have a circular bearing portion 54 which complements the curved portion of the key holes 45 in order to facilitate rotation of the links with respect thereto. The U-shaped portion 34 has a shoulder 56 which abuts wall 57 of the yoke in order to longitudinally position the links 32.

Figure 3:
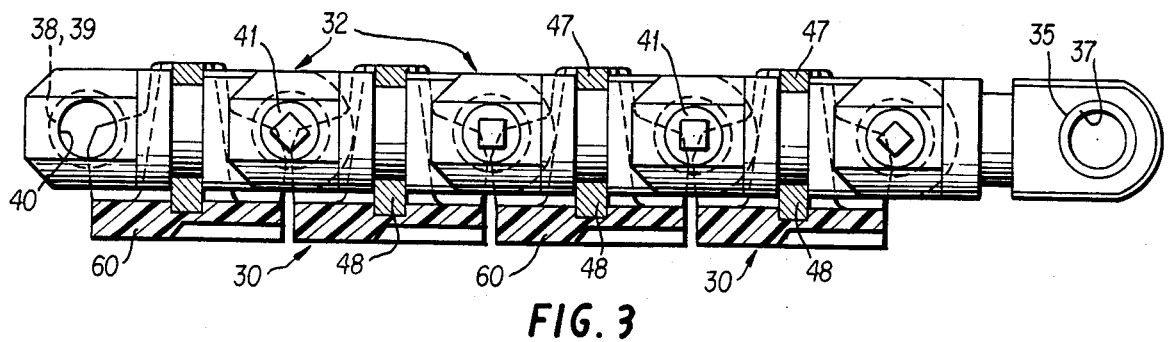
FIG. 3 is a longitudinal cross-sectional and partial side view, taken along Line 3—3 of FIG. 4, showing several shoes assembled together to form a track.
Figure 4:
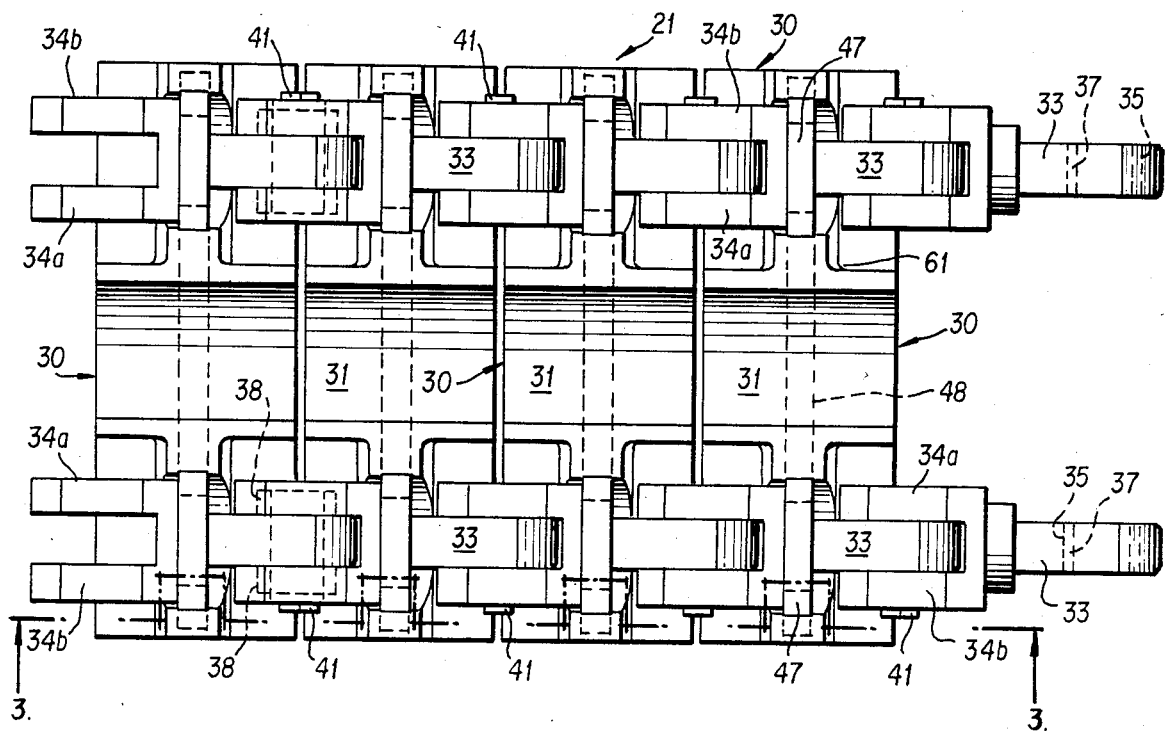
FIG. 4 is a top view of the track of FIG. 3.
Figure 5:
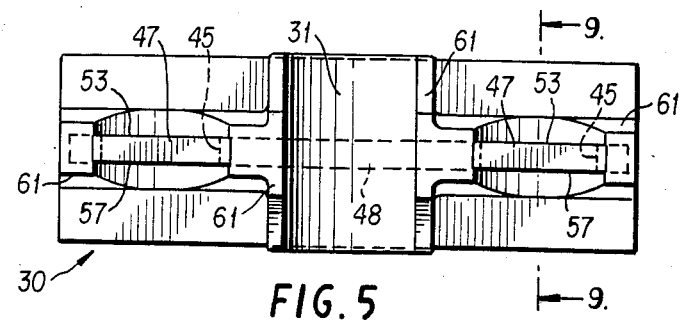
FIG. 5 is a top view of a single shoe such as that shown in FIG. 2.
Figure 6:
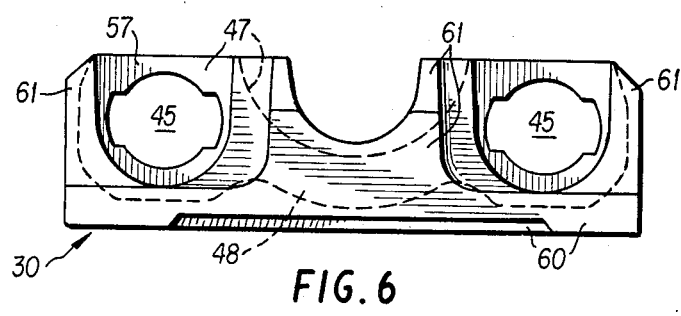
FIG. 6 is a rear elevational view of the single shoe shown in FIG. 2, the front view being only slightly different due to the chevron shaped grouser on the bottom of the shoe.
Figure 7:
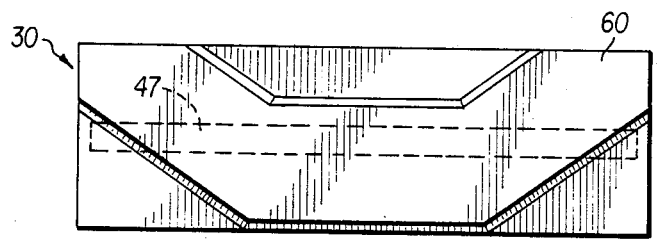
FIG. 7 is a bottom view of the single shoe shown in FIG. 2.
Figure 8:
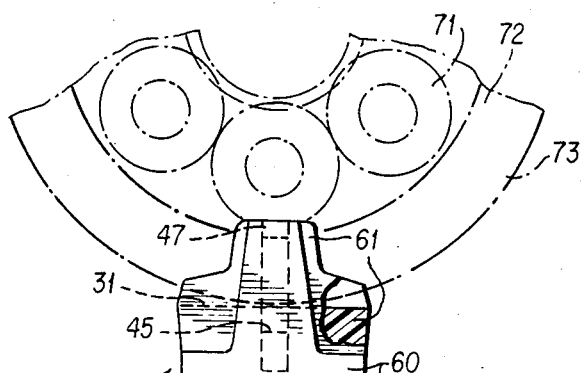
FIG. 8 is an end view, partially in cutaway cross-section and partially in broken or phantom line, showing a single road wheel riding on one shoe of the track shown in FIG. 5.
Figure 9:
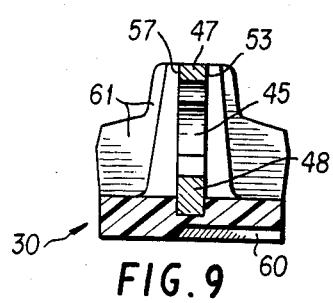
FIG. 9 is a cross-sectional view taken along line 9—9 of FIG. 5.
Figure 10:
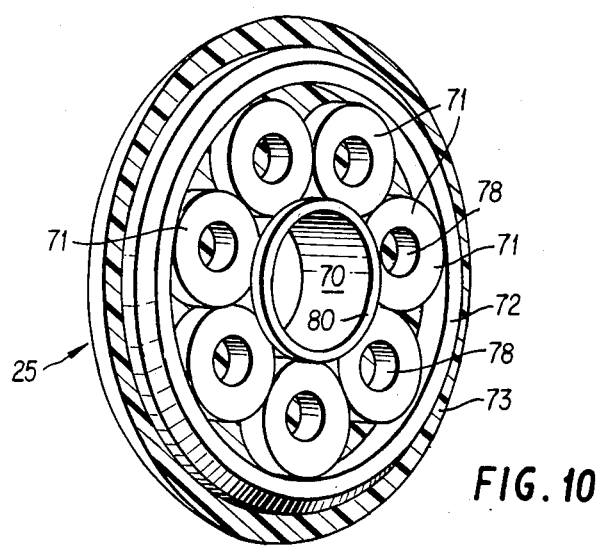
FIG. 10 is a perspective cutaway view of a road wheel in accordance with the instant invention, with the peripheral portion shown in cross-section.

As seen in FIGS. 3 and 4, a plurality of the shoes 30 are linked together by the links 32 to form track 21. If a section of the track 21 comprising one or more shoes 30 is damaged and needs to be replaced, then outwardly facing cap 41 is unscrewed and pin 36 extracted to facilitate replacement of the damaged section. This can be done relatively easily with simple tools and a minimal number of spare parts.

Referring now to FIGS. 5 through 9, a single shoe 30 is shown in detail. Each shoe 30 is made of molded fiberglass and defines a basic planar bottom portion having a projected generally chevron-shaped tread portion 60 which engages the ground to pull the tank along, and further having a transversely projecting molded body portion 61 which extends upwardly away from the bottom of the shoe and is molded around the steel yoke 47. The steel yoke 47 is a unitary member in which the key slots 45 are connected together by a cross piece 48. The cross piece 48 extends beneath the groove 31 to give further support for the road wheels 25.

Figure 11:
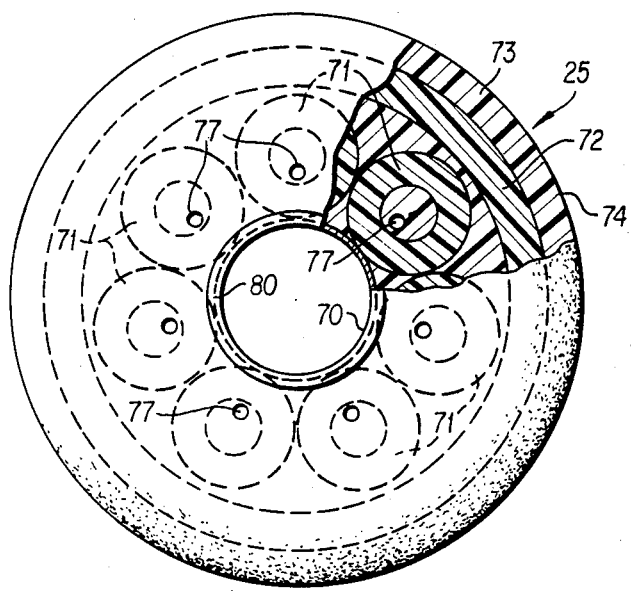
FIG. 11 is a side view, partially cut away and partially in phantom, of the road wheel shown in FIG. 10.
Figure 12:
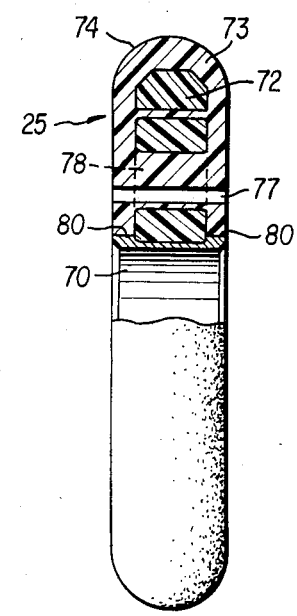
FIG. 12 is an edge view of the road wheel shown in FIGS. 10 and 11 with portions cut away.
Figure 13:
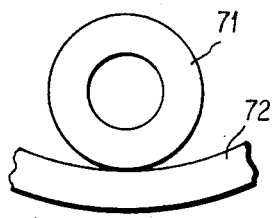
FIG. 13 is a side view showing a support ring and road wheel rim under normal conditions.

Referring now to FIGS. 10 through 15, where a single road wheel 25 is shown, it is seen that each road wheel 25 includes a center hub 70 possibly made of aluminum, a circular array of fiberglass support rings 71, a fiberglass rim 72, and a layer of urethane encapsulant 73. The urethane encapsulant 73 surrounds the rim 72 and covers the fiberglass support rings 71. In addition, the encapsulant forms the running surface 74 of the wheel which rides in slot 31 of the track 21 as the vehicle rolls. In order to mount the wheels 25 on the tank 20, a plurality of mounting bores 77 are formed through the encapsulant material which fills the respective center holes 78 of the support rings 71. As is seen in FIGS. 11 and 12, the urethane encapsulant fills up the entire volume of the wheel, with the exception of the bores 77 and the area defined by the inner surface of the center hub 70. In order to further rigidify the structure, the center hub 70 has a pair of outwardly extending rims 80 between which the fiberglass support rings 71 are mounted.

Figure 14:
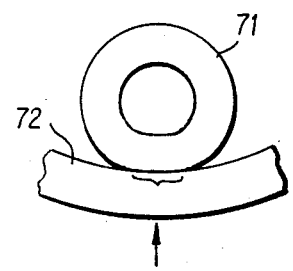
FIG. 14 is a side view showing the support ring and road wheel rim upon the occurrence of an explosive impact, such as when the tank tread runs over a mine.
Figure 15:
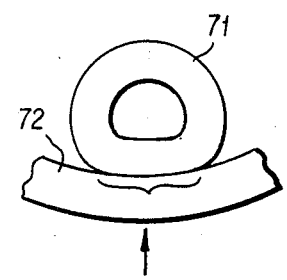
FIG. 15 is a side view, similar to FIG. 14, showing the end result of an explosive impact wherein the support ring has been substantially flattened along a portion of the perimeter thereof.

By utilizing single road wheels 25 in lieu of the dual road wheels of the prior art, and by using track shoes having semicircular grooves 31 for maintaining proper track alignment and interface with the road wheels, all in combination with the aforedescribed more resilient shock-absorbing urethane and molded fiberglass componentry, a large amount of explosive blast from a mine flows by the wheels and is dissipated quickly. As is seen in FIGS. 14 and 15, the mode of deformation or shock-absorbing distention of the road wheel 25 under load from an explosive blast occurs initially at a single point of tangency between the outer rim 72 and one of the inner rings 71. As the explosive blast load is applied, both the rim 72 and the inner ring 71 deform so that the area of mutual contact increases continuously. Since the rim-ring contact area increases continuously during loading, structural discontinuity does not occur at a single point, and a large velocity gradient is spread over a wider area. Depending upon the size of the explosive charge, structural damage is minimized and, in many cases, eliminated.

By combining the unique wheel 25 with the unique shoe 30, which provides a minimum area of primary structure adjacent to an explosive blast, a track assembly 21 is provided with substantially increased prospects of survivability.

What is claimed is:

1. A track and road wheel assembly to help support and propel a tracked vehicle having a hull supported on an endless track subassembly by plural road wheel subassemblies, said assembly comprising:

A. an endless track subassembly comprising a. a plurality of pivotally interconnected track shoes, each shoe having a body of composite material and including
   (i) an outer generally non-metallic rigid body material formed around a more rigid, metallic inner body support member having spaced-apart link-receiving apertures at opposed lateral sides;
   (ii) a generally planar bottom side portion having a tread surface for engaging the ground to help propel the vehicle, the body and tread surface being formed of the same non-metallic rigid material;
   (iii) a transversely projecting medial body portion projecting upwardly away from the shoe's bottom side portion and constituting in part support means thereof and said link-receiving apertures extending through said medial body portion, and between which apertures there is a central groove transversely through an upper portion of said medial body portion for cooperative engagement by the road wheels;
b. connecting link means including plural connecting links and bushed retainer pin means for releasable interlocking relation through said link-receiving apertures in a manner facilitating supportive pivotal interconnection of a plurality of adjacently disposed track shoes into an endless flexible track; and
B. a plurality of road wheels each adapted to be operatively mounted respectively with a hull-attached road wheel support arm, said plural road wheels collectively adapted for cooperative working relation with said endless track subassembly via said road wheels, and said road wheels each having an outer peripheral rolling surface for complementally engaging said central grooves of passing track shoes of said endless track assembly.

2. A track and road wheel assembly as defined in claim 1, wherein
said track shoe composite body includes a fiberglass material outer body portion molded around the metal inner support member,
and the inner support member, link and pins are all of high strength metal material.

3. A track and road wheel assembly as defined in claim 2, wherein said metal inner body support member is of generally planar yoke shape with the yoke openings constituted by said pair of spaced-apart link-receiving apertures, said apertures being of partially rounded keyhole slot form having a limited diametrically enlarged dimension adapted to receive therethrough one end of the connecting link when oriented in a first axial position, and the lesser size remainder portion of said keyhole slot adapted to engagingly lock and retain said link when the link is oriented in a second axially rotated position, thus providing releasable interlocking means for joining a large plurality of track shoes into a flexible endless track.

4. A track and road wheel assembly as defined in claim 1, wherein said connecting links each have a single leg portion at one end and a bifurcated or spaced-apart two leg portion at the opposite end, with the single leg sized to have a sliding fit between the spaced two leg portion of an adjoining shoe-carried connecting link, said legs retaining-pin-receiving aperture means complementally placed to assure connective alignment and pin insertion to assemble an endless track.

5. A track and road wheel assembly as defined in claim 1, wherein said connecting links and said bushed retainer pin means include elastomeric type bushing or bearing means carried in the apertures provided in said connecting links, thus providing additional overall shock-absorbing quality to the assembly.

6. A track and road wheel assembly as defined in claim 1, wherein said road wheels are each fabricated of composite plastic and metal materials.

7. A track and road wheel assembly as defined in claim 6, wherein each of said road wheels comprises:
   (a) a high strength metallic annular center hub member having axially inner and outer radially outwardly turned flanges;
   (b) a plurality of circular support rings or bands formed of fiberglass material, which are distributed circumferentially generally uniformly around the hub member and essentially nesting between its radial flanges;
   (c) a larger annular rim wheel encircling and at least partially generally holding the plurality of circular support rings or bands against the hub member; and
   (d) an encapsulating plastic outer body material molded around and through the rim wheel and support rings or bands and uniting them with said hub member.

8. The assembly of claim 7 wherein said larger annular rim wheel is fiberglass material, and wherein said encapsulating plastic outer body material has a rounded outer transverse cross-section and a circular outer periphery for engaging a complemental shaped groove formed in the endless track members.

9. For use in a track and road wheel assembly a composite track shoe for use in constructing an endless track, said composite track shoe comprising
   (i) an outer generally non-metallic rigid body material formed around a more rigid, metallic inner support member having spaced-apart link-receiving apertures at opposed lateral sides;
   (ii) a generally planar bottom side portion having a tread surface for engaging the ground to help propel the vehicle, the body and tread surface being formed of the same non-metallic rigid material; and
   (iii) a transversely projecting medial body portion projecting upwardly away from the shoe's bottom side portion and constituting in part support means thereof and being cooperatively formed about said link-receiving apertures, and between which apertures there is a central arcuate groove transversely through an upper portion of said medial body portion for cooperative engagement by the road wheels.

10. The track shoe of claim 9, wherein the outer non-metallic rigid body, bottom and tread portions are made of fiberglass material.

11. An endless track assembly for use with a combined track and road wheel assembly, said track assembly comprising
   (a) a plurality of pivotally interconnected composite material track shoes, each shoe being made of an inner high strength metal support or core insert member having laterally spaced link-receiving apertures, and surrounded by molded fiberglass material providing a medial body portion and a generally planar bottom portion also having an integrally molded traction tread portion projecting from the bottom portion; and (b) connecting link means and retaining pin means for operably connecting a requisite predetermined number of track shoes together in a flexible/pivotal endless manner.

12. The endless track assembly as defined in claim 11, wherein said molded fiberglass medial body portion includes a central downwardly molded groove portion of which the groove is oriented transversely to the metal support member, and said groove being of a size and adaptable for complemental operable cooperation with complementally designed road wheels.

13. The track assembly of claim 11, wherein
said inner metal support member is of a generally planar yoke shape which includes laterally spaced portions having said apertures and connected by a coplanar strut portion which has an arcuate depression in its upper edge, and
said molded fiberglass medial body portion includes a central downward molded groove oriented transversely to the planar metal support member and extending downwardly into said arcuate depression of said strut portion;
said groove being sized and adapted for complemental operable cooperation with complementally designed road wheels.

14. The track assembly of claim 11, wherein said connecting link means of paragraph (b) includes a plurality of elongated links of the general clevis type, each link including (i) a bifurcated two leg or generally U-shape portion at one end whose legs equally straddle a longitudinal center axis and of which the base of the U-shape portion is of a greater diametrical dimension than said link-receiving apertures;

(ii) a cylindrical middle portion sized for close-fitting axial rotatable cooperation in said apertures; and (iii) an axially aligned adjoining single leg lead end portion having a shape and size for both complemental mating between the two legs of an adjoining connecting link and for free insertion through a link-receiving aperture of the shoe body when the link is oriented in a first position, but which is of a size that exceeds said aperture when link is oriented in an axially rotated second position;

(iv) whereby when the connecting links are inserted through their shoe body apertures and are axially rotated as described, said connecting links are retained in subassembly relationship with their associated track shoe in readiness for pivotal interconnecting assembly to form an endless track.

15. The track assembly of claim 10, wherein said two legs portion and said single leg portion of the connecting links have bushing or bearing-lined transverse pin-receiving apertures at the center axis level and complementally positioned to assure mating pivotal interconnection of adjoining links by application of said retaining pin means, thereby assuring good pivotal interconnection of a predetermined number of the track shoes into a completed endless track.

16. The track assembly of claim 15, wherein the bushings or bearings within the links' transverse pin-receiving apertures preferably are of an elastomeric type with an elastomeric material sandwiched between radially spaced bearing or bushing sleeve members.

17. The track assembly of claim 15, wherein
the retaining pin means (of paragraph (b) of claim 11) include retaining pins of a diameter and length to assure proper operative assembly with said links, and
wherein said two leg portion of said connecting links are provided wih removable cover or cap means for selectively protectively covering and uncovering and thus enabling selective ingress and egress of the retaining pins to provide for the assembly or disassembly of the interconnected plurality of track shoes.

* * * * *